United States Patent [19]

Nolte

[11] E Re. 31,074

[45] Reissued Nov. 9, 1982

[54] WELL SURVEYING INSTRUMENT AND METHOD

[75] Inventor: Ernst P. Nolte, Hildesheim, Fed. Rep. of Germany

[73] Assignee: Prakla-Seismos G.m.b.H, Hanover, Fed. Rep. of Germany

[21] Appl. No.: 137,526

[22] Filed: Apr. 4, 1980

Related U.S. Patent Documents

Reissue of:

[64] Patent No.: 3,614,891
Issued: Oct. 26, 1971
Appl. No.: 807,883
Filed: Mar. 17, 1969

[51] Int. Cl.[3] ..... E21B 47/00

[52] U.S. Cl. ..... 73/151; 250/256; 356/241; 367/86

[58] Field of Search ..... 73/151, 152, 155, 596; 356/241; 250/256, 259, 260, 269, 270; 354/126; 367/86

[56] References Cited

U.S. PATENT DOCUMENTS

| | | | |
|---|---|---|---|
| 2,648,778 | 8/1953 | Silverman et al. | 250/83.6 W UX |
| 2,688,095 | 8/1954 | Andrews | 250/65 |
| 2,703,395 | 3/1955 | Ruble | 340/8 |
| 2,825,044 | 2/1958 | Peterson | 340/18 |
| 2,837,727 | 6/1958 | Mayes | 340/6 |
| 2,865,014 | 12/1958 | Malm | 340/3 |
| 2,868,506 | 1/1959 | Nestle | 73/155 X |
| 2,908,863 | 10/1959 | Neff | 324/67 |
| 2,909,661 | 10/1959 | Armistead | 250/83.3 |
| 2,942,111 | 6/1960 | Worthington | 250/269 X |
| 3,100,259 | 8/1963 | Allen et al. | 250/43.5 |
| 3,172,344 | 3/1965 | Jackson | 354/126 |
| 3,227,804 | 1/1966 | Johnson | 178/6 |
| 3,286,163 | 11/1966 | Holser et al. | 324/6 |
| 3,288,210 | 11/1966 | Bryant | 250/83.6 W |
| 3,425,507 | 2/1969 | Caldwell et al. | 73/624 X |
| 3,517,768 | 6/1970 | Straus... | 181/0.5 |

FOREIGN PATENT DOCUMENTS

| | | |
|---|---|---|
| 169154 | 4/1919 | Fed. Rep. of Germany . |
| 723764 | 6/1942 | Fed. Rep. of Germany . |
| 1786877 | 2/1956 | Fed. Rep. of Germany . |
| 1082994 | 6/1960 | Fed. Rep. of Germany . |
| 1085978 | 7/1960 | Fed. Rep. of Germany . |
| 1102306 | 3/1961 | Fed. Rep. of Germany . |
| 1130089 | 5/1962 | Fed. Rep. of Germany . |
| 1189903 | 1/1956 | France . |
| 183782 | 7/1936 | Switzerland . |
| 422181 | 4/1967 | Switzerland . |

OTHER PUBLICATIONS

EDO Report 4211, AN/SQN-3, (XN-1) General Description (Manuscript), pp. 1-4, 1-5, 2-12, EDO Corporation.

"Elac Mittel-Lodar" brochure, Electroacustic GmbH, 2300 Kiel, West Germany.

Wesmar Sonar, brochure published by Western Marine Electronics, Inc., Seattle, Washington.

The Sea Spy SS100, Horizontal Scan Sonar Owners Manual, Western Marine Electronics, Seattle, Washington.

NAVSHIPS 92655, Sonar Transducer Handbook, Dept. of The Navy, Bureau of Ships (Jun. 1956) (cover, pp. 2-3 and 2-43).

Erdoel-Zeitschrift, vol. 78, Oct. 1962, p. 587.

Hobby, Mar. 1961, pp. 152-157.

VDI-Nachrichten, No. 15, Jul. 20, 1957, p. 4.

Holander, D. E., Caliper Logging Tools, from Oil and Gas Equipment, Mar. 1966, Logging Equipment-Part 12.

Patterson, G. D. et al., The Sonar Caliper . . . Solution Mined Cavities, ASME paper for presentation Sep. 17-20, 1967.

Patterson, G. D., Feasibility of Measuring Spherical Cavities . . . Methods, AEC Contract No. AT (29-2-)-1084, 1962.

*Primary Examiner*—Jerry W. Myracle

*Attorney, Agent, or Firm*—Roylance, Abrams, Berdo & Farley

[57] ABSTRACT

A surveying instrument for investigating the character of an underground cavity penetrated by a borehole, includes an elongated instrument housing and a lower section containing means to generate and receive energy, such as a surveying transceiver. The lower section is pivotally and rotatably movable about the lower end of the housing enabling the entire surface of the cavity to be surveyed.

15 Claims, 10 Drawing Figures

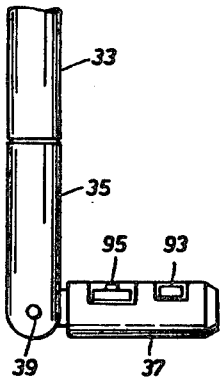
FIG. 4
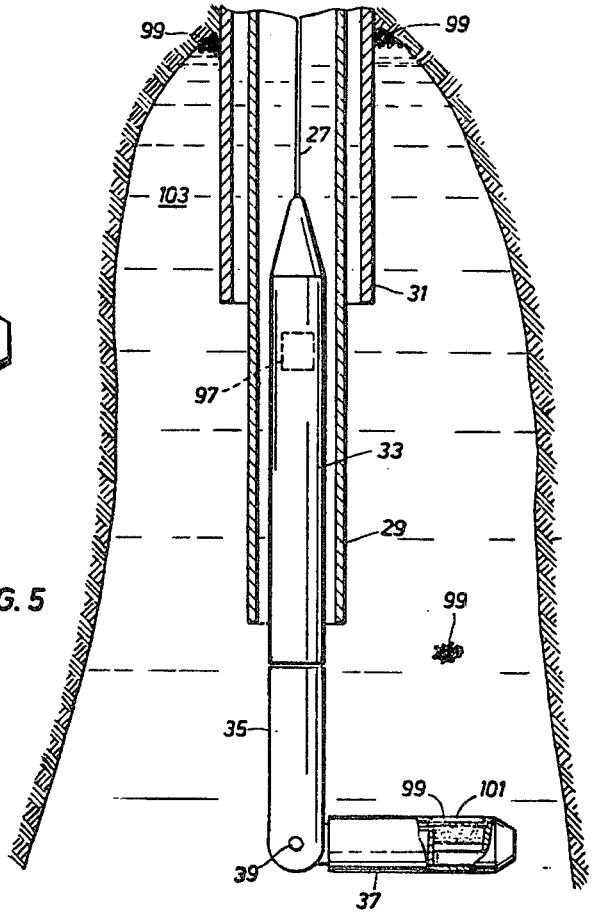
FIG. 5
FIG. 6
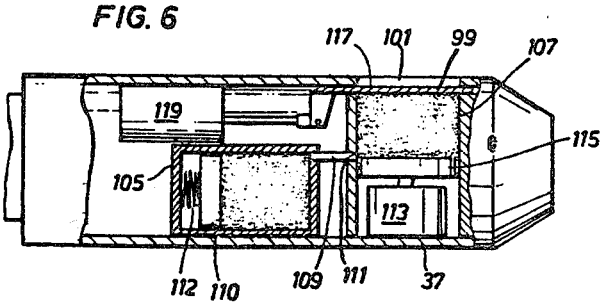

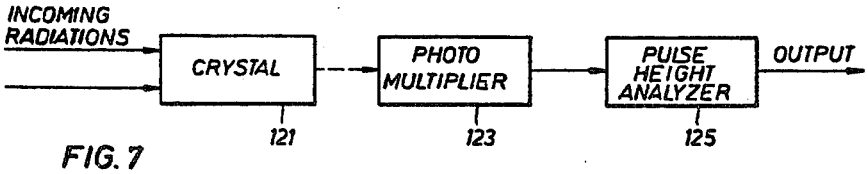
FIG. 7
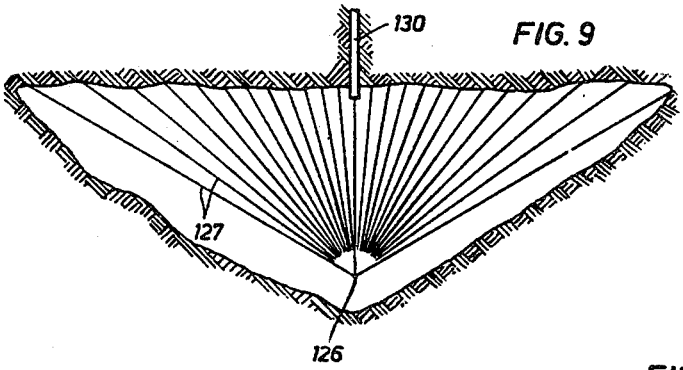
FIG. 9
FIG. 8
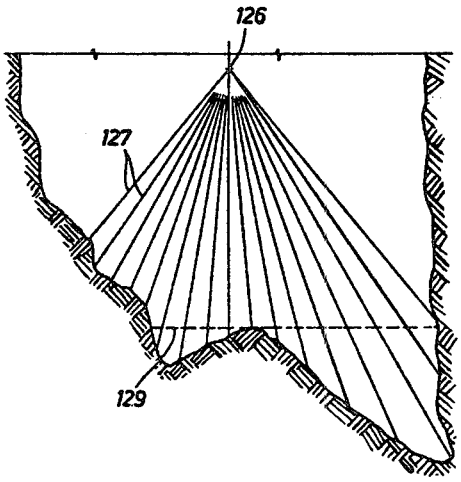
FIG. 10
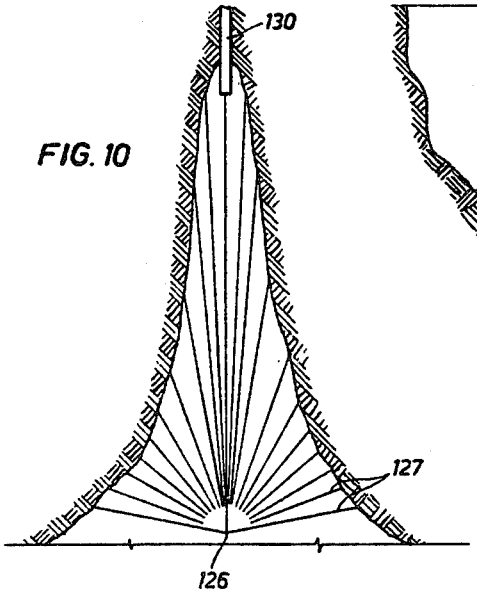

WELL SURVEYING INSTRUMENT AND METHOD

Matter enclosed in heavy brackets [ ] appears in the original patent but forms no part of this reissue specification; matter printed in italics indicates the additions made by reissue.

BACKGROUND OF THE INVENTION

Field of the invention

The present invention relates to apparatus and methods for underground surveying, and more particularly, to apparatus and methods for surveying underground cavities.

Description of the prior art

It is useful to know the size, shape and orientation of certain underground cavities, such as salt cavities, to determine whether such cavities can be used economically for storage of liquid petroleum products, natural gas, and the like. For determining the storage capacity, the effective volume of the cavity must be known.

Also, for reasons of safety, the cavity dimensions should be known. For example, if the horizontal dimensions of the cavity are too great, the likelihood of a cave-in is increased.

Further, a dangerous "chimney" is often formed during the drilling of a borehole into the cavity. A "chimney" is the space around a casing at the upper part of the cavity formed by erosion or earth breaking away during drilling the borehole or installing the casing. Such a chimney can cause a cave-in of the earth layers above the cavity.

It is therefore important to know the exact dimensions of the cavity and the existence and dimensions of any chimneys.

Surveying tools, such as sonar tools, are known for determining the size of underground cavities. However, the irregular shapes of some cavities render it impossible to survey the entire cavity with such tools.

Further, such tools can only survey in limited directions in the cavity, such as horizontally, so that some areas of the cavity, such as depressions in the bottom or chimneys at the top, remain unsurveyed.

Also when using sonar surveying tools, irregular shaped cavities can cause scattering of reflected signals causing erroneous measurements.

It is therefore a feature of this invention to provide apparatus and methods to investigate the entire dimensions and orientation of a cavity.

It is also a feature of the invention to provide methods and apparatus to determine all of the surface irregularities of a cavity.

It is another feature of the invention to provide methods and apparatus to determine the location and existence of cavity chimneys.

SUMMARY OF THE INVENTION

In accordance with a first aspect of this invention, a novel method is provided for investigating the character of a subsurface earth cavity penetrated by a borehole, comprising: establishing a pivot point in the cavity at a selected location on the axis of the borehole, establishing a generating point pivotally movable in the cavity about the pivot point, and projecting radiant energy, such as radiations, acoustic energy, visible light, or infrared beams into the cavity from the generating point, and then sensing radiant energy to determine the dimensions or configuration of the cavity.

In accordance with a second aspect of this invention, there is provided apparatus for investigating the configuration of a subsurface earth cavity, or the like, penetrated by a borehole, comprising an instrument having an elongated lower section pivotally connected to an upper section of the instrument. The lower section includes a source of radiant energy and receiving means for detecting radiant energy. The instrument may also include [meas] *means* for rotatably orienting the upper section about the axis of the borehole as a function of some fixed reference point, such as north.

BRIEF DESCRIPTION OF THE DRAWINGS

So that the manner in which the above-cited features, advantages, and objects of the invention, as well as others which will become apparent, are attained and can be understood in detail, more particular description of the invention briefly summarized above may be had by reference to the embodiments thereof which are illustrated in the appended drawings, which drawings form a part of this specification. It is noted, however, that the appended drawings illustrate only typical embodiments of the invention and are therefore not to be considered limiting in scope, for the invention may admit to other equally effective embodiments.

In the drawings:

FIG. 4 is a side view of the invention according to a second embodiment of the invention;

FIG. 5 is a side view of the invention according to a third embodiment of the invention;

FIG. 6 is a partial sectional view of the lower section of the instrument of FIG. 5;

FIG. 7 is a schematic diagram of the sensing means of the instrument of FIG. 5;

FIG. 8 is a diagram of a partial scan of a cavity by the instrument of this invention;

FIG. 9 is a diagram of a partial scan of the top of a cavity by the instrument of this invention;

FIG. 10 is a diagram of a scan of a cavity chimney by the instrument of this invention.

For purposes of this disclosure, the term "acoustic" is defined as any mechanical vibration and includes ultrasonic and subsonic frequencies as well as audible frequencies. Also, "light" is intended to include energy in the infrared and ultraviolet spectrum, as well as visible light.

Figure 1:
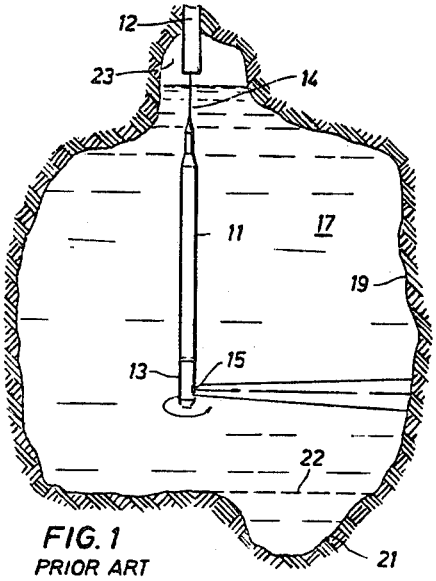
FIG. 1 PRIOR ART
FIG. 1 is a side view of a prior art surveying instrument suspended in a subsurface earth cavity.

Referring now to FIG. 1, a prior art surveying instrument is shown suspended through casing 12 into cavity 17 by cable 14 and having an instrument housing 11 and a measuring head 13 rotatable about the longitudinal axis of housing 11. Head 13 may contain an acoustic transceiver 15 adapted to emit sound pulses perpendicularly from head 13, i.e., horizontally into cavity 17, and to acoustic energy reflected from the interior surface 19 of the cavity 17.

After transceiver 15 receives a reflected pulse, head 13 is rotated either stepwise or continuously and another sound pulse is emitted and received by transceiver 15. This scanning process continues until head 13 is rotated 360° allowing a panoramic echogram, or "horizontal profile" to be recorded. The entire instrument can be raised or lowered to a different height to record another horizontal profile.

In summary of operation of the prior art instrument illustrated in FIG. 1, the emitted sound pulses strike the cavity wall, roof or floor, and sound energy is reflected back to transceiver 15 which converts the reflected acoustic energy, called an "echo," into an electrical signal. The signal is then transmitted to the earth's surface to be displayed on an oscilloscope or permanently recorded—called an "echogram"—e.g. by a strip chart recorder. The echograms are interpreted to determine the distance from transceiver 15 to cavity surface 19.

The distance from the transceiver to the reflecting surface is calculated from the equation:

$$d=0.5tv$$

where d=the distance to the reflecting surface; t=the travel time of the pulse from the transceiver to the reflecting surface and back; and v=the velocity of propagation in the cavity fluid. Propagation velocity may be found by using a sample of fluid from the cavity (brine in the case of a salt cavity) and a reflector spaced a known distance from transceiver 15.

Horizontal scanning yields satisfactory results for cavities without irregular shapes.

However, most cavities are formed as a result of water-soluble mineral recovery techniques, such as circulation of water through two boreholes which causes the development of steadily "growing" cavities. Due to partially or totally insoluble material embedded in the water-soluble minerals, the shapes of such cavities are usually severely irregular.

As a result, portions of the cavity may go undetected. For example, the tool shown in FIG. 1 cannot survey depression 21 below dotted line 22. In fact, even if the tool is lowered to the floor of the cavity, depression 21 will go undetected since the transceiver emits only in horizontal planes. Also, down-hanging or rising parts of the cavity roof or wall, or caved-in material on the bottom can block the sound pulses from reaching opposite parts of the cavity.

Often, a dangerous chimney 23 is formed by erosion caused by circulation of liquids during mineral recovery or by earth eroding or breaking away around casing 12. Such chimneys usually go undetected when cavities are surveyed by known instruments and methods.

Figure 2:
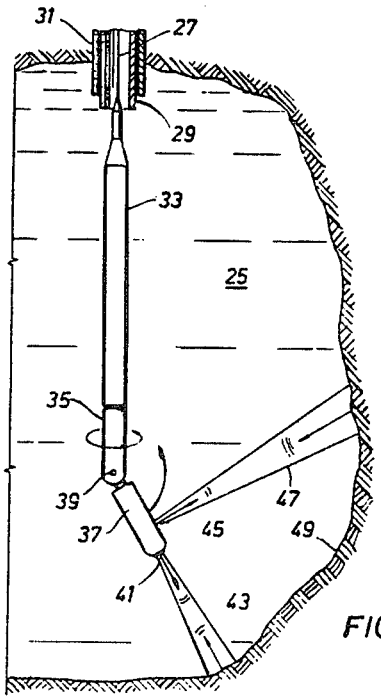
FIG. 2 is a surveying instrument according to a first embodiment of the invention.

FIG. 2 shows a novel surveying instrument according to one embodiment of the invention suspended in cavity 25 from cable 27 extending through instrument casing 29 which lines borehole casing 31.

The surveying instrument includes an instrument housing 33 having an upper end connected to cable 27, an upper section 35 rotatably connected to the lower end of housing 33, and a lower section 37 pivotally connected to the lower end of upper section 35 at pivot point or connection 39.

Lower section 37 includes energy sources for projecting radiant energy into cavity 25, such as an acoustic energy generator/receiver unit 41 for producing a beam 43 of acoustic energy pulses from a generating point directed along a path coincident with the longitudinal axis of lower section 37, and acoustic energy generator/receiver unit 45 for producing a similar beam 47 of acoustic energy pulses from a generating point directed along a path perpendicular to the longitudinal axis of lower section 37. The receiver portions of acoustic units 41 and 45 include means to sense acoustic energy pulses of beam 43 and 47, respectively, reflected from cavity surface 49. Both acoustic units 41 and 45 are conventional and need not be described in detail herein.

It has been found that the resolution of the scanning, and thus the resolution of the generated echograms from which the cavity dimensions are determined, is improved by decreasing the width of acoustic beams 43 and 47. While beam width decreases as the frequency of the generated pulses increases, the maximum distance from the acoustic units that can be measured decreases as the frequency increases.

For example, while a 1,000 [kHz.] *Khz.* acoustic beam provides better resolution than a 600 [kHz.] *Khz.* beam, the 600 [kHz] *Khz.* beam will measure distance up to 300 feet in salt water, while a 1,000 [kHz.] *Khz.* beam will measure effectively only up to 100 feet. Accordingly, acoustic units 41 and 45 may be provided with selectable generating frequencies, such as 200, 600 and 1,000 [kHz.] *Khz.*

In operation, the surveying instrument is lowered into cavity 25 to a selected depth which may be determined in any well known manner, such as by using casing collars for depth reference points and an electromagnetic detector (not shown) in housing 33 for generating a casing collar log from which the depth of the instrument is determined.

As reflected acoustic pulses are sensed by acoustic units 41 and 45, electrical signals are transmitted to the surface for recording a series of echograms, as described above.

Lower section 37 is pivoted about connection 39 such that beam 43 scans from 0 to 90 degrees in a vertical plane, while beam 47 scans from 90 to 180 degrees in the same plane. The echogram produced by a single scan from 0 to 180 degrees in a vertical plane is referred to as a cross-section or "vertical profile."

Lower section 37 is then rotated a selected angular amount about the vertical axis of the borehole and the scanning from 0 to 180 degrees is repeated. Both the pivoting of lower unit 37 and the rotation of upper unit 35 can be in discrete steps or continuously.

A selected number of such vertical profiles are produced by rotating upper section 35 from 0 to 360 degrees about the vertical axis of the borehole to determine the exact dimensions of the cavity.

As a check, the complete scanning of the cavity may be repeated, or the instrument may be lowered or raised to a different selected depth at which a second complete scan may be performed.

Another effective method of surveying a cavity includes lowering the instrument to a selected depth; pivoting lower section 37 to a convenient angle with respect to the axis of the borehole, e.g. 45 degrees; scanning the cavity while rotating upper section 35 from 0 to 360 degrees, raising or lowering the instrument a selected distance, e.g. 3 feet; and repeating the scanning by rotating upper section 35 again from 0 to 360 degrees, lower section 37 remaining at the same angle relative the borehole axis.

The method is repeated until the instrument has made a scan at every 3 foot depth interval of the cavity. The echograms are then conveniently interpolated to determine the exact configuration and dimensions of the cavity.

Figure 3:
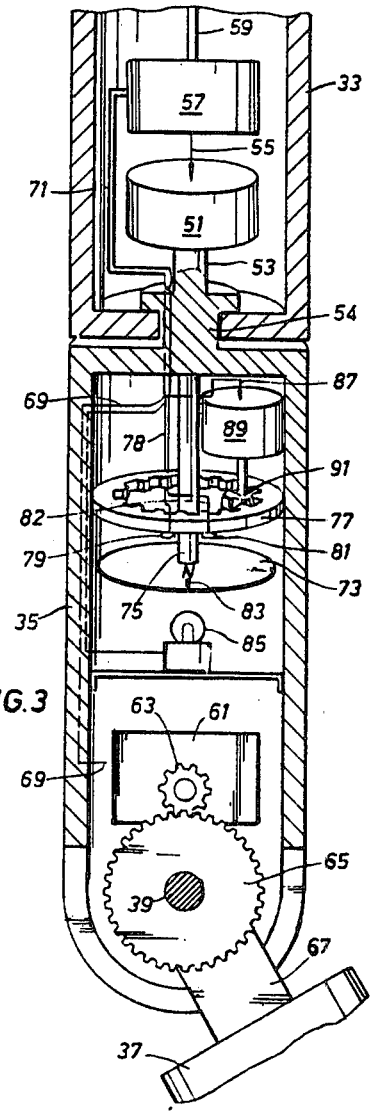
FIG. 3 is a partial sectional view of the instrument of FIG. 2.

FIG. 3 shows a partial sectional view of the drive means of the instrument. Housing 33 includes a rotation servo motor 51 having a drive shaft 53 connected to rotate shaft 54 and upper section 35. Motor 51 responds to a "rotation" command signal via cable 55 from control unit 57 which includes amplifiers and relays to process control signals received via cable 59 from the surface. Motor 51 and associated control circuitry may be selected to rotate upper section 35 about the borehole axis in discrete angular steps or continuously, as described above.

Upper section 35 includes a pivot servo motor 61 mechanically connected through reduction gears 63 and 65 to lower section shaft 67. Motor 61 responds to signals via cable 69 extending through shaft 54 to a commutator network (not shown) connected to cable 71 from control unit 57. Motor 61 causes lower section 37 to pivot about connection 39 from 0 to 90 degrees. Again, the pivotal movement of lower section 37 may be in discrete steps or continuous.

In addition to determining the dimension of a cavity, it is important to know the orientation of the cavity relative any fixed point, such as magnetic north.

The surveying instrument includes orienting means to control the rotation of upper section 35 to orient lower section 37 relative a fixed reference point in the horizontal plane, such as magnetic north. Upper section 35 includes a compass 73 suitably damped, as by liquid, mounted on stem 75 in axial alignment with section 35, and hence the borehole.

A ring 77 concentric with stem 75 has two proximately spaced photocells 79 and 81 at its outer perimeter and connected to unit 57 via conductors 78 and 82. Compass 73 serves as strobe disc having a strobe mark or hole 83 in radial alignment with the north pole of the compass. Upon receiving an "orientation" command signal from unit 57 via cable 55, motor 51 rotates upper section 35 until a light beam from a lamp 85 passes through strobe mark 83 on compass disc 73 and is straddled by photocells 79 and 81. Ring 77 is normally oriented in upper section 35 such that when strobe mark 83 is in alignment between the photocells, lower section 37 is oriented such that a vertical profile generated in that position is aligned with magnetic north.

The surveying instrument also includes means for orienting upper section 35 so that a vertical profile can be generated at any selected angle relative magnetic north. After the instrument is aligned with magnetic north, as described above, an "orient+" or "orient−" signal is received via cable 59 to control unit 57, and through cables 71 and 87 to orientation motor 89 which rotates ring 77 by means of planetary gear train 91.

For example, an "orient+15°" signal causes motor 89 to rotate ring 77 in a positive angular direction from its previous normal position so that photocells 79 and 81 are rotated 15 degrees accordingly. An "orientation" command signal again causes upper section 35 to rotate until the photocells straddle strobe mark 83, as described previously, but now lower section 37 is oriented such that a pivotal scan of the cavity will generate a vertical profile 15° relative magnetic north.

While the embodiment of FIG. 3 describes strobe mark 83 located on compass disc 73 such that the instrument will align with magnetic north, other embodiments of the invention admit to locating strobe mark 83 such that the instrument aligns with geographic north, or any other azimuthal direction.

FIG. 4 shows the surveying instrument according to a seond embodiment of the invention; however, instead of acoustic units 41 and 45 shown in FIG. 2, lower section 37 includes a generating source of light rays, such as lamp 93, and a receiving means responsive to such light rays, such as camera 95.

By pivoting lower section 37 and rotating upper section 35, as described above, a photograph can be made of every portion of a cavity, illumination of the cavity being provided by lamp 93. Further, the exact orientation of the photograph can be determined by orienting and rotating the instrument as described above and shown in FIG. 3. While FIG. 4 shows one camera and lamp, it is understood that the invention includes embodiments utilizing a plurality of lamps and cameras having any desired orientation in lower section 37 relative the longitudinal axis of section 37.

As previously mentioned, it is important to know the existence and exact location of potentially dangerous chimneys formed at the top of the cavity around the casing. While it is often necessary to extend a shoe casing or instrument casing into the cavity, such casings may cause scattering or attenuation of reflected acoustical pulses when scanning the upper part of the cavity. Scattering or attenuation of reflected signals may cause erroneous results when interpreting echograms or oscilloscope traces.

FIG. 5 shows a surveying instrument according to a third embodiment of the invention which indicates the existence and exact location of such chimneys without the usual attendant problems of signal scattering or attenuation.

Lower section 37 includes means for generating radioactive energy, such as means for discharging a plastic-like carrier material containing a discrete quantity of radio-active flotation material 99, such as gamma-ray emitting material into the cavity from a selected generating point or discharge outlet 101 in section 37. Instrument housing 33 contains a radiation detector, such as scintillation counter 97 for sensing the radiations emanating from the discharged radioactive flotation material to determine the existence and location of chimney 103.

In operation, the surveying instrument is lowered through instrument casing 29 and shoe casing 31 into the cavity. Lower [sections] *section* 37 is then pivoted about connection 39, as described above, until discharge outlet 101 is spaced far enough from the axis of the borehole such that flotation material 99 floats upward in the cavity into chimney 103 about the exterior surface of casing 31. Since radioactive material 99 is lighter than the cavity fluid, radioactive material 99 will rise to the top of chimney 103 and lodge around the outside of casing 31. Upper section 35 may be rotated about the axis of the borehole as previously described so that radioactive material 99 is distributed about the upper part of chimney 103 and around casing 31.

After discharging radioactive material 99, lower section 37 is pivoted into axial alignment with the borehole and the surveying instrument is withdrawn through the borehole. The radiation intensity as indicated by scintillation counter 97 will be at a maximum when counter 97 is nearest radioactive material 99, i.e. when the instrument is withdrawn to the point that counter 97 is directly opposite or in the same horizontal plane as material 99. Since the depth of counter 97 is known, the existence and exact location of chimney 103 is, therefore easily determined.

FIG. 6 shows a detailed sectional view of the lower section 37 of FIG. 5, including a replaceable container 105 of radioactive flotation material 99 communicating with a discharge chamber 107 through tube 109 and inlet 111. Material 99 in container is under pressure, such as by plunger 110 and spring 112.

Solenoid 113 is actuated by a control signal from the surface causing a plunger 115 to rise in chamber 107 to discharge material 99. As plunger 115 passes inlet 111, a spring-loaded slidable cover 117 uncovers discharge outlet 101 by means of solenoid 119, and material 99 is forced out into the cavity by rising plunger 115. Solenoid 119 releases cover 117 which closes outlet 101, and solenoid 113 then retracts plunger 115 down past inlet 111, and chamber 107 is again filled with material 99.

FIG. 7 shows a diagram of a conventional scintillation counter 97 including crystal 121 for receiving radiations emanating from material 99, a photomultiplier 123 in optical connection with crystal 121, and a pulse height analyzer 125 connected to receive the output of photomultiplier 123. The output of analyzer 125 is transmitted via a conductor (not shown) to the surface for recording or observation by any suitable display device.

FIG. 8 is a diagram of a partial vertical scan of a cavity by the surveying instrument at a depth indicated at 126. Solid lines 127 represent the path of generated and reflected energy such as acoustic pulses from and to acoustic unit 41 (FIG. 2). Note that the entire surface of the cavity floor is scanned, whereas the horizontal scanning tool, described previously, would not scan below horizontal line 129.

FIG. 9 is a diagram of a partial vertical scan of a flatroofed cavity, as for example, by acoustic unit 45 (FIG. 2), while FIG. 10 is a diagram of a scan of a narrow chimney aound casing 130.

While the invention is described above with reference to specific embodiments, it is understood that further modifications and equally effective embodiments will become apparent to those skilled in the art. For example, lower section 37 can be made to pivot 360° about connection 39, thus requiring only one radiant energy generator/receiver unit in the lower section.

What is claimed is:

[1. Method of investigating the character of a subsurface earth cavity, or the like, penetrated by a borehole, comprising establishing a radiant energy source in said cavity at a selected location on the vertical axis of said borehole, projecting radiant energy from said source into said cavity at selected angles from said vertical axis, and rotating said source about said vertical axis of said borehole.]

[2. Method according to claim 1, wherein said radiant energy is radioactive energy.]

[3. Method according to claim 2, including discharging a discrete quantity of radioactive flotation material from said generating point into said cavity, and sensing radiations emanating from said discharged material.]

[4. Method according to claim 3, wherein said borehole is lined by a casing extending from said borehole into said cavity, and said radioactive material floats upward in said cavity, about the exterior surface of said casing.]

[5. Method according to claim 1, wherein said radiant energy is acoustic energy.]

6. Method [according to claim 5, including] *of investigating the size and shape characteristics of a subsurface earth cavity, or the like, penetrated by a borehole, comprising the steps of*

*establishing a radiant acoustic energy source in said cavity at a selected location on the vertical axis of said borehole,*

*projecting radiant acoustic energy during a substantially continuous scan from said source into said cavity at a plurality of selected angles between about 0° and about 180° from said vertical axis, such that the acoustic energy is directed at selected portions of the walls and roof of the cavity including those portions adjacent the borehole;*

*rotating said source about said vertical axis of said borehole, and* receiving reflected acoustic energy.

7. Method according to claim [5] *6* including orienting said generating point with respect to north.

[8. Method according to claim 1, wherein said radiant energy is light.]

[9. Method according to claim 8, including receiving reflected light to make a photograph.]

[10. Method according to claim 9, including orienting said generating point with respect to north.]

[11. Method according to claim 1 wherein radiant energy is projected into said cavity in at least two directions.]

[12. Apparatus for investigating the character of a subsurface earth cavity, or the like, penetrated by a borehole, comprising an instrument having an intermediate section swivelly connected for horizontal rotation and an elongated lower section pivotally connected with said intermediate section of said instrument for movement in a plane transverse to the horizontal, a source of radiant energy in said lower section, and receiving means in said instrument for detecting radiant energy.]

[13. Apparatus according to claim 12, wherein said energy source includes means for discharging a discrete quantity of radiation flotation material into said cavity, and said receiving means includes means for sensing radiations.]

[14. Apparatus according to claim 13 including means for rotating said upper section about the axis of said borehole.]

15. Apparatus [according to claim 12, wherein] *for investigating the character of a subsurface earth cavity, or the like, penetrated by a borehole, comprising*

*an instrument having an intermediate section swivelly connected for horizontal rotation and an elongated lower section pivotally connected with said intermediate section of said instrument for movement in a plane transverse to the horizontal,*

*a source of radiant energy in said lower section,* said energy source [includes] *including* acoustic energy generating means for producing a beam of acoustic energy, and

*receiving means in said instrument,* said receiving means [includes] *including* means in said lower section for sensing reflected acoustic energy.

16. Apparatus according to claim 15, wherein said beam is directed along a path coincident with the longitudinal axis of said lower section.

17. Apparatus according to claim 15, wherein said beam is directed along a path angularly intersecting the longitudinal axis of said lower section.

18. Apparatus according to claim 15, including means for rotating said upper section about the axis of said borehole.

19. Apparatus according to claim 18, including orienting means for controlling said rotating means as a function of north.

20. Apparatus according to claim 18, including orienting means for controlling said rotating means as a function of north.

[21. Apparatus according to claim 12, wherein said energy source generates an output of light rays, and said receiving means includes a camera responsive to said light rays.]

[22. Apparatus according to claim 21, including means for rotating said upper section about the axis of said borehole.]

[23. Apparatus according to claim 22, including orienting means for controlling said rotating means as a function of north.]

24. Apparatus for investigating the character of a subsurface earth cavity, or the like, penetrated by a borehole, comprising an instrument having an intermediate section swivelly connected for horizontal rotation and an elongated lower section pivotally connected with said intermediate section of said instrument for movement in a plane transverse to the horizontal, means in said lower section for radiating energy therefrom toward the cavity in a plurality of directions, and receiving means in said instrument for detecting radiant energy.

25. Method of investigating the character of a subsurface earth cavity, or the like, penetrated by a borehole, comprising establishing a pivot point in said cavity at a selected location on the vertical axis of said borehole, establishing a generating point pivotally movable in said cavity relative said pivot point, projecting radioactive energy into said cavity from said generating point by discharging a discrete quantity of radioactive flotation material from said generating point into said cavity, and sensing radiations emanating from said discharged material.

26. Method according to claim 24, wherein said borehole is lined by a casing extending from said borehole into said cavity, and said radioactive material floats upward in said cavity about the exterior surface of said casing.

27. Apparatus for investigating the character of a subsurface earth cavity, or the like, penetrated by a borehole, comprising an instrument having an elongated lower section pivotally connected with an upper section of said instrument, means for rotating said upper section about the axis of the borehole, a source of radiant energy in said lower section, said energy source including means for discharging a discrete quantity of radiation flotation material into said cavity, and receiving means in said instrument for detecting radiant energy including means for sensing radiations.

28. Apparatus for investigating the character of a subsurface earth cavity, or the like, penetrated by a borehole, comprising an instrument having an elongated lower section pivotally connected with an upper section of said instrument, means for rotating said upper section about the axis of the borehole, a source of radiant energy in said lower section, said energy source including acoustic energy generating means for producing a beam of acoustic energy, receiving means in said instrument for detecting radiant energy including means in said lower section for sensing reflected acoustic energy, and means for positioning said lower section, at selected angles with respect to the longitudinal axis of said upper section.

29. Apparatus for investigating the character of a subsurface earth cavity, or the like, penetrated by a borehole, comprising an instrument having an elongated lower section pivotally connected with an upper section of said instrument, means for rotating said upper section about the axis of the borehole, a source of radiant energy in said lower section, said energy source penetrating an output of light rays, receiving means in said instrument for detecting radiant energy including a camera responsive to said light rays, and orienting means for controlling said rotating means as a function of north.

*30. An apparatus for investigating the size and shape characteristics of a subsurface earth cavity penetrated by a borehole comprising*

*an instrument having an intermediate section and an elongated lower section, said instrument being capable of being lowered through the borehole so that said intermediate section thereof at least partially enters the cavity,*

*said intermediate section being swivelly supported for rotation about an axis which is generally parallel with the borehole axis;*

*means for pivotally connecting said lower section to said intermediate section so that said lower section is pivotable in generally vertical planes relative to said intermediate section about a generally horizontal axis;*

*drive means for pivoting said lower section relative to said intermediate section;*

*at least one acoustic energy generating means in said lower section for transmitting acoustic energy in a direction generally perpendicular to the longitudinal axis of said lower section toward wall and roof portions of the cavity as said lower section is pivoted about said generally horizontal axis; and*

*means in said lower section for receiving reflected acoustic energy, whereby said instrument can be selectively rotated and said lower section pivoted to direct acoustic energy toward, and receive reflected acoustic energy from, substantially all portions of said cavity.*

* * * * *